United States Patent [19]

Thiene

[11] 4,267,490

[45] May 12, 1981

[54] BINARY SWITCHING CONTROL CIRCUIT FOR AN ELECTRICALLY ADJUSTABLE PATIENT CHAIR

[75] Inventor: Paul G. Thiene, Laguna, Calif.

[73] Assignee: SMR Corporation, St. Louis, Mo.

[21] Appl. No.: 66,457

[22] Filed: Aug. 14, 1979

[51] Int. Cl.³ .............................................. H02P 1/54
[52] U.S. Cl. ...................................... 318/51; 318/34; 318/53; 297/68; 297/330; 307/38
[58] Field of Search ............................ 318/34, 51, 53; 297/284, 310, 330, 68, 90, 75, 325, 345; 307/40, 38, 112, 113, 115

[56] References Cited

U.S. PATENT DOCUMENTS

| | | | |
|---|---|---|---|
| 3,147,385 | 9/1964 | Burgis | 307/38 |
| 3,414,324 | 12/1968 | Taylor et al. | 297/68 X |
| 4,128,797 | 12/1978 | Murata | 297/330 X |

Primary Examiner—Ulysses Weldon
Attorney, Agent, or Firm—Harness, Dickey & Pierce

[57] ABSTRACT

A switching control circuit for an electrically adjustable patient chair that utilizes a relay control circuit comprised of a plurality of switching control relays connected in a binary switching arrangement which in the preferred embodiment herein, permits the use of only three control relays to control six motor adjustment functions.

1 Claim, 3 Drawing Figures

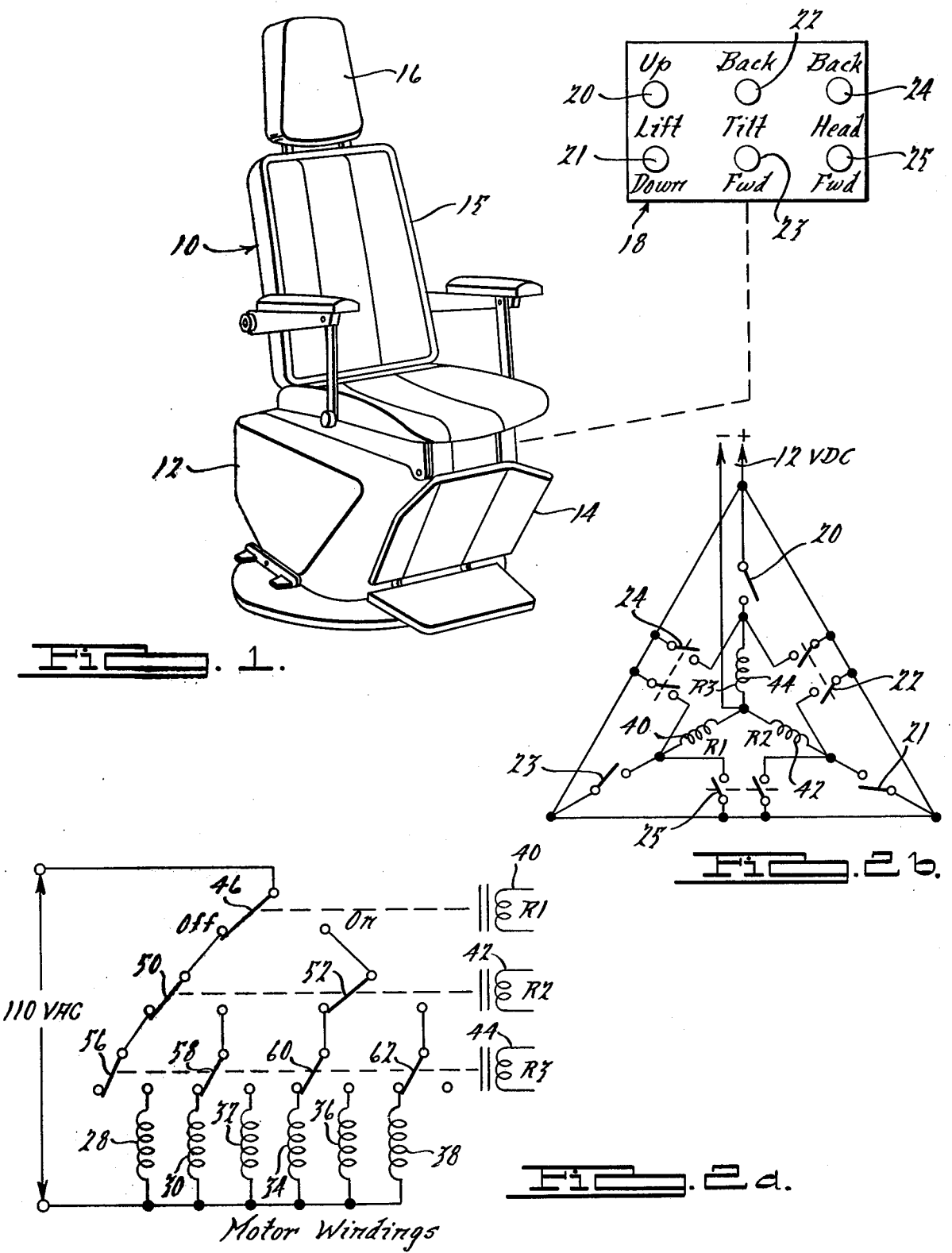

4,267,490

BINARY SWITCHING CONTROL CIRCUIT FOR AN ELECTRICALLY ADJUSTABLE PATIENT CHAIR

BACKGROUND AND SUMMARY OF THE INVENTION

The present invention relates to a switching control system for an electrically adjustable patient chair and in particular to a relay control circuit that utilizes binary switching to control the various motor windings in the chair.

Patient chairs utilized in medical and dental offices typically have electrical height, tilt and/or head adjustment controls. A patient chair with all three adjustment features requires six different motor windings; namely lift up and lift down, tilt back and tilt forward, and head back and head forward. Generally, it has been the practice to provide high current switches that are connected directly in series with the respective motor windings to control the energization thereof. The disadvantages with this approach, of course, are that the control switches must be large and therefore expensive, and high current wiring must be run from the switches to the motors, thus necessitating the use of a rather large cable if a remote switching console pod is utilized.

The obvious approach to avoid these disadvantages is to provide a relay for each motor winding which eliminates the need for having the control switches carry the entire load current. The problem with this approach, however, is that for a chair having six different motor windings, six separate relays are required. The present invention seeks to simplify even further the complexity of the high current wiring for a patient chair of this type by utilizing a reduced number of relays connected in binary fashion to control all of the motor windings. In particular, for a chair having six motor windings, the switching control circuit of the present invention requires only three relays. In this manner, the control circuit is simplified by making more effective use of the high current components in the system.

Additional objects and advantages of the present invention will become apparent from a reading of the detailed description of the preferred embodiment which makes reference to the following set of drawings in which:

BRIEF DESCRIPTION OF THE DRAWINGS

FIG. 1 is a pictorial view of a patient chair of the general type to which the present invention pertains; and FIGS. 2a and 2b are a circuit diagram of the switching control circuit according to the present invention.

DETAILED DESCRIPTION OF THE PREFERRED EMBODIMENT

Referring to FIG. 1, a pictorial view of a patient chair 10 of the general type contemplated by the present invention is shown. The chair 10 has a base 12 that is adjustable up and down, a leg rest 14 and back support 15 that tilt back and forth, and a headrest 16 that is adjustable backwards and forwards. Adjustment of the position of the chair 10 is controlled by a switching console 18 that is electrically connected to the chair 10. The switching console 18 may be located on the side of the chair 10 or remotely from the chair 10 on an instrument console or embodied in a foot switch. In view of the fact that the patient chair 10 described herein has full lift, tilt and head adjustment capabilities, the switching console 18 comprises six (6) momentary control switches 20-25 to control each of the various adjustment functions. In particular, momentary switches 20 and 21 control the up and down LIFT adjustment functions, switches 22 and 23 control the backward and forward TILT adjustment functions, and switches 24 and 25 control the backward and forward HEAD adjustment functions. Optionally, three rocker or "paddle" type switches could be substituted for the six individual pushbutton switches 20-25 illustrated in the drawing. With this approach, each switch would control both adjustments for one of the LIFT, TILT and HEAD adjustment functions.

Turning now to FIGS. 2a and 2b, a circuit diagram of a switching control system according to the present invention is shown. The portion of the control system illustrated in FIG. 2a is the high power section of the circuit and the portion illustrated in FIG. 2b is the low power section. With particular reference to FIG. 2a, the control circuit is adapted to control the energization of the six motor windings 28-38 which are required in order to provide the various modes of adjustment of the patient chair 10 described above. The control circuit in the preferred embodiment includes three relays R1-R3. Relay R1 comprises a switching contact 46 that is switched from its OFF position to its ON position when relay coil 40 is energized. Relay R2 comprises a pair of switching contacts 50 and 52 that are controlled by the energization of relay coil 42, and relay R3 comprises four switching contacts 56-62 which are all controlled by the energization of relay coil 44. The various relay contacts are connected between a 110 volt a.c. power source and six motor windings 28-38 in a binary switching arrangement such that relay contacts 50 and 52 control the application of power to relay contacts 56-62 and relay contact 46 controls the application of power to relay contacts 50 and 52. The control circuit operates in the following manner.

With each of the three relays R1-R3 de-energized, all of the relay contacts are all in the OFF position. When relay R3 is energized while relays R1 and R2 remain off, relay contacts 56-62 are switched to their ON positions. However, only motor winding 28, corresponding to the LIFT up adjustment, is energized thereby. When relay R2 is energized while relays R1 and R3 remain off, relay contacts 50 and 52 are switched to their ON positions, thus energizing motor winding 30, which corresponds to the LIFT down adjustment. Similarly, when both relays R2 and R3 are energized with relay R1 off, relay contacts 50 and 52 and contacts 56-62 are switched to their ON positions. This condition then results in the energization of motor winding 32 which corresponds to the TILT back adjustment. When only relay R1 is energized, relay contact 46 is switched to its ON position to energize motor winding 34, which corresponds to the TILT forward adjustment. Furthermore, when relay R1 is energized in combination with relay R3, relay contact 46 as well as contacts 56-62 are switched to their ON positions, thereby energizing motor winding 36, which corresponds to the HEAD back adjustment. Finally, when relay R1 is energized together with relay R2, relay contacts 46, 50 and 52 are switched to their ON positions, which energizes the remaining motor winding 38 corresponding to the HEAD forward adjustment.

To control the energization of relays R1-R3 in the manner described, the momentary control switches 20-25 are connected in the configuration illustrated in FIG. 2b. In particular, it will be noted that in the preferred embodiment, control switches 20, 21 and 23 are single-pole single-throw switches, and control switches 22, 24 and 25 are double-pole single-throw switches. Alternatively, if rocker-type switches are utilized, then the three switches required would all be double-pole triple-throw switches. The six momentary control switches 20-25 control the energization of the relay coils 40-44 of relays R1-R3, which correspond to the same relay coils 40-44 illustrated in FIG. 2a. The circuit operates in the following manner.

When control switch 20 is depressed, which corresponds to the LIFT UP adjustment function, relay coil 44 of relay R3 is energized. When control switch 21 is depressed, which corresponds to the LIFT DOWN adjustment function, relay coil 42 of relay R2 is energized. Upon actuation of double-pole control switch 22, which corresponds to the TILT BACK adjustment function, both relay coils 42 and 44 of relays R2 and R3, respectively, are energized. Depression of pushbutton control switch 23, which corresponds to the TILT FORWARD adjustment function, results in the energization of relay coil 40 of relay R1. When control switch 24 is depressed, which corresponds to the HEAD BACK adjustment function, both relay coils 40 and 44 of relays R1 and R3, respectively, are energized. Finally, when control switch 25 is depressed, which corresponds to the HEAD FORWARD adjustment function, both relay coils 40 and 42 of relays R1 and R2, respectively, are energized.

In summary, therefore, the present switching control circuit operates according to the following table:

| ADJUSTMENT FUNCTION | MOTOR WINDINGS | RELAYS | | |
|---|---|---|---|---|
| | | R1 | R2 | R3 |
| LIFT UP | 28 | OFF | OFF | ON |
| DOWN | 30 | OFF | ON | OFF |
| TILT BACK | 32 | OFF | ON | ON |
| FWD | 34 | ON | OFF | OFF |
| HEAD BACK | 36 | ON | OFF | ON |
| FWD | 38 | ON | ON | OFF |

Thus, it can be seen that the control circuit according to the present invention succeeds in controlling all six motor adjustment functions with the use of only three control relays. As will readily be appreciated by those skilled in the art, different implementations of the disclosed concept are possible without departing from the scope of the present invention.

While the above description constitutes the preferred embodiment of the present invention, it will be appreciated that the invention is susceptible to modification, variation and change without departing from the proper scope or fair meaning of the accompanying claims.

What is claimed is:

1. A switching control circuit for selectively controlling the energization of six motor windings for providing lift, tilt and head adjustments on an electrically adjustable patient chair, comprising three relays connected to said motor windings in a binary switching arrangement for separately controlling the energization of each of said motor windings, and six manually operable switch means connected between a power source and the relay coils of said relays for controlling energization of said relay coils, wherein a first of said switches comprises a single-pole single-throw switch that is connected to the relay coil of said first relay, a second of said switches comprises a double-pole single-throw switch that is connected to the relay coils of said first and second relays, a third of said switches comprises a single-pole single-throw switch that is connected to the relay coil of said second relay, a fourth of said switches comprises a double-pole single-throw switch that is connected to the relay coils of said second and third relays, a fifth of said switches comprises a single-pole single-throw switch that is connected to the relay coil of said third relay, and a sixth of said switches comprises a double-pole single-throw switch that is connected to the relay coils of said first and third relays.

* * * * *